June 29, 1965    D. W. DENNISTON    3,192,024
METHOD AND APPARATUS FOR FORMING GLASS FIBERS
Filed Nov. 21, 1961    2 Sheets-Sheet 1
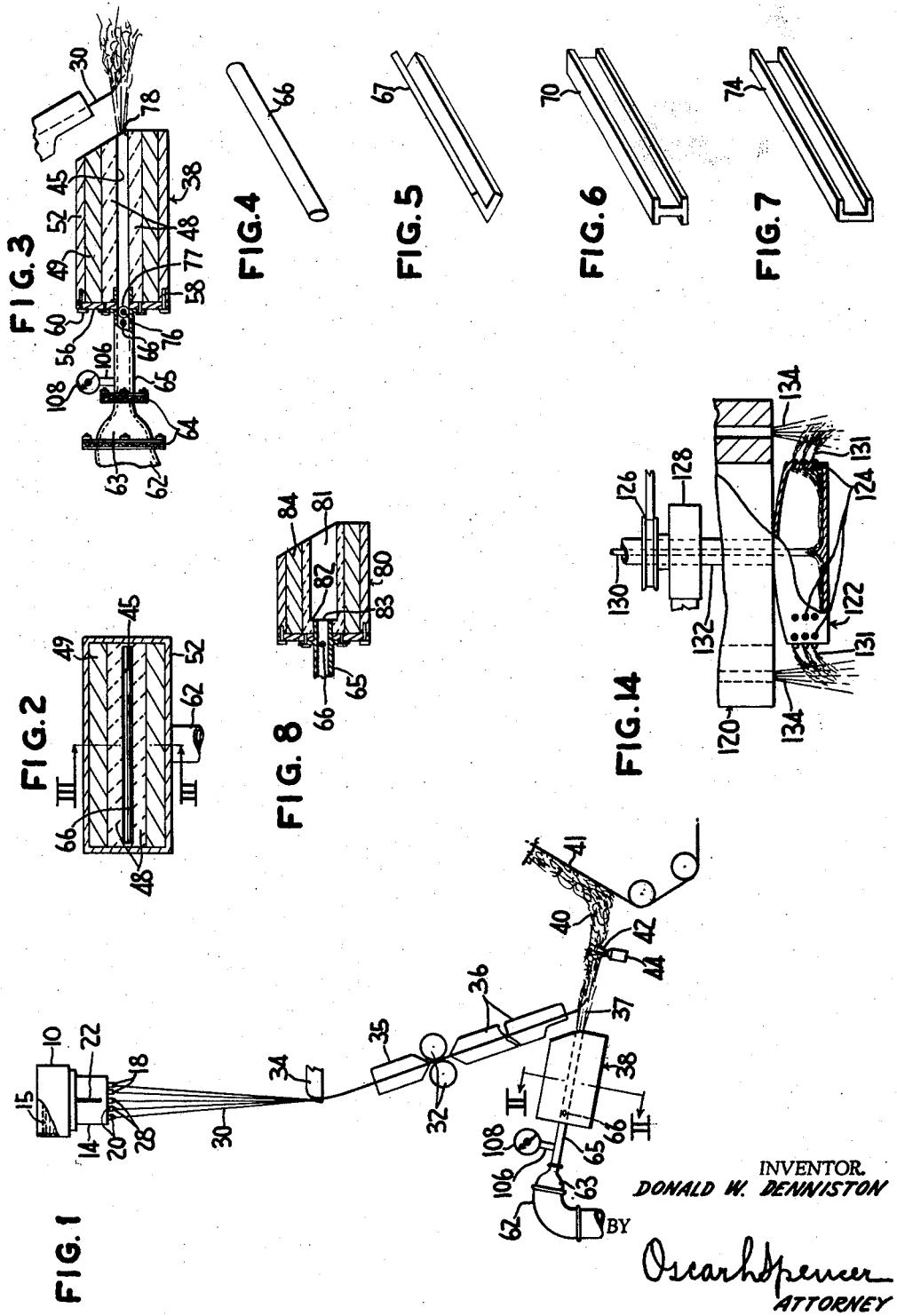
INVENTOR.
DONALD W. DENNISTON
BY Oscar H. Spencer
ATTORNEY June 29, 1965  D. W. DENNISTON  3,192,024
METHOD AND APPARATUS FOR FORMING GLASS FIBERS
Filed Nov. 21, 1961  2 Sheets-Sheet 2
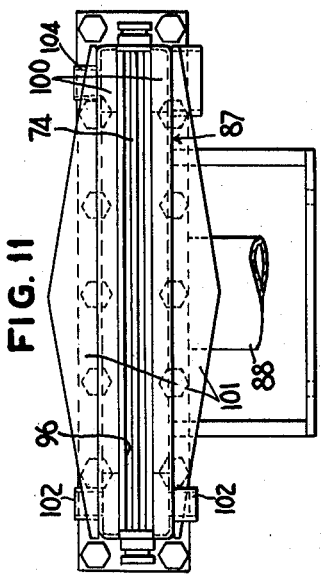
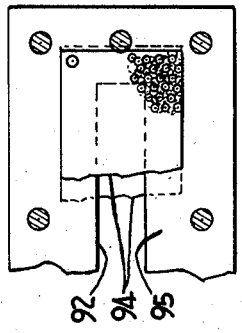
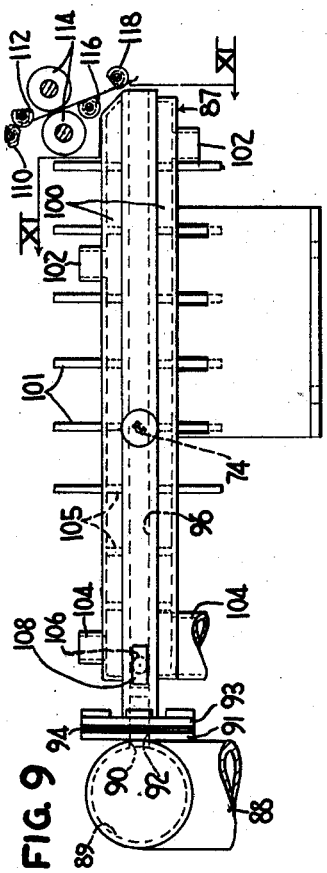
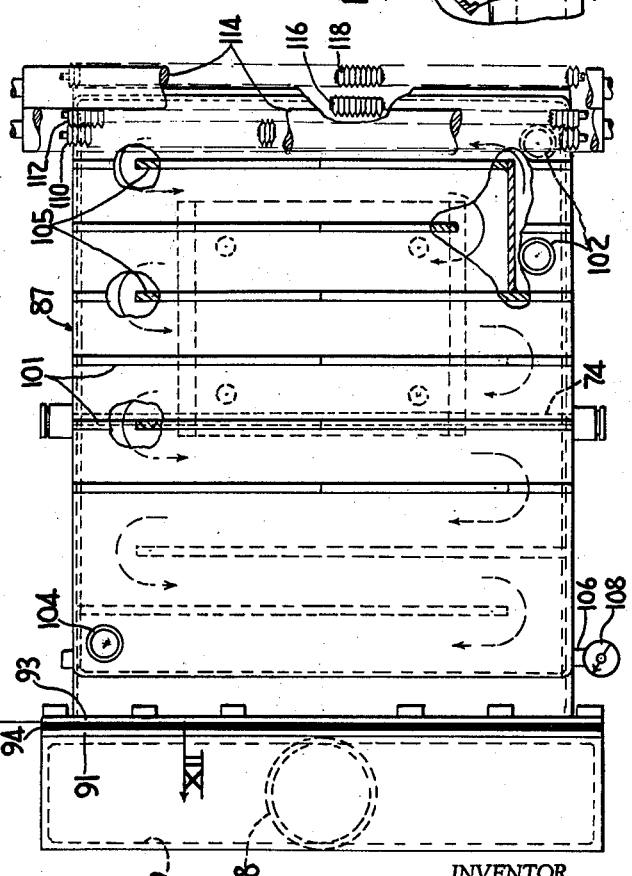
INVENTOR.
DONALD W. DENNISTON
BY Oscar L. Spencer
ATTORNEY

3,192,024
METHOD AND APPARATUS FOR FORMING GLASS FIBERS

Donald W. Denniston, Pittsburgh, Pa., assignor to Pittsburgh Plate Glass Company, Pittsburgh, Pa., a corporation of Pennsylvania
Filed Nov. 21, 1961, Ser. No. 153,952
6 Claims. (Cl. 65—7)

This application is a continuation-in-part of my copending application Serial No. 8,651, filed February 15, 1960, now abandoned.

This invention relates to a method of and an apparatus for forming glass fibers, and it has particular relation to a method of and an apparatus for forming very fine fibers by means of a high temperature, high velocity, highly turbulent gaseous blast.

U.S. Patent No. 2,489,243 describes a method of and an apparatus for forming very fine, discontinuous, glass fibers. In this method, a high velocity, high temperature, gaseous blast contacts a solid filament or stream of glass at an angle, for example a right angle, and heats the filament or stream to a temperature sufficient to soften it and permit it to be attenuated by means of the velocity of the blast. The blast is formed in a combustion chamber burner by introducing a combustible mixture of gases at a relatively low average flow velocity, i.e., 20 to 35 feet per second, and at a relatively low pressure, i.e., 2 to 10 pounds per square inch, and substantially completely burning the gases within the chamber. The burned gases issue through a restricted orifice at one end of the chamber as a high temperature (2600–3200° F.), high velocity (500–700 feet per second) blast. The restriction of the gases as they pass through the orifice greatly accelerates them and provides the blast with the high velocity. Usually the ratio of the cross-sectional area of the chamber in which the gases are burned to the cross-sectional area of the outlet orifice of the chamber is between 4 to 1 and 8 to 1.

One of the characteristics of the blast produced in this manner is that a great deal of the turbulence formed in the blast during the burning of the gases within the chamber is reduced by the restriction of the gases as they pass through the restricted orifice. This reduction in turbulence decreases the efficiency of the blast in heating the solid glass filament to fiberizing temperatures and in attenuating the softened filament. A high temperature, highly turbulent blast transfers heat to the filament much faster than a blast having less turbulence and also attenuates the softened filaments or streams to a greater degree than a blast with less turbulence.

Another characteristic of the blast produced in the manner set forth in the patent is that the burning of the gases as they pass through the chamber proceeds through the mixture of combustible materials from the walls of the chamber in towards the center of the chamber. Thus, if there is any portion of the combustible mixture of gases which is not burned, this portion of the gases is in the center of the gases which pass out through the restricted outlet and are impinged against the glass filaments. It occasionally happens that in the central portion of the blast as it passes through the restricted outlet, there is a substantial portion of unburned gases. Thus, the center of the blast is cooler than other portions of the blast. This is undesirable for maximum heating of the filament will not be obtained in the center of the blast where the velocity of the blast is greatest and the filament will not be softened sufficiently to permit it to be attenuated to as great an extent as if the center portion of the blast was formed of completely burned gases at the maximum temperature.

The burner employed in the process described in the patent is extremely bulky and this creates several problems in the operation of the process. The overall width of the burner is several inches wider than the width of the blast produced by the burner. This extra width is taken up by the refractory insulation surrounding all sides of the burner chamber. When a plurality of these burners are mounted side by side in a forming chamber so as to fiberize a plurality of primary rods or filaments directed in a row into the blasts formed by the burners, there is a space of about 5 to 6 inches between burner blasts which represents unproductive area in the forming chamber. It is a desideratum of the art to be able to use a plurality of attenuating blasts which are practically adjacent each without having substantial unproductive areas between the blasts.

The bulky nature of the burner of the unpatented process also prevents access to the primary rods in the area immediately above the burner blast where the fibers are guided into the blast. A much simplified guide is desired in place of the guides shown in the patent. The guides of the patent do not permit the passage of "stones" in the primary rods. These stones are formed in several ways. Improper melting of the glass results in devitrified portions in the glass which appear as stones. Occasionally, portions of the refractory material forming the walls of the melting tank are dissolved into or fall into the molten glass and are carried through the bushing orifices and appear in the attenuated primary filaments. The "stones," coated with glass, are of greater diameter than the diameter of the primary filament and do not pass through the openings in the guide. This results in temporary loss of production from the position taken up by the particular filament.

A simplified guide, such as a threaded or grooved rod, which will pass "stones" in the primary filament, is desired as a substitute for the guide shown in the patents. This guide must be located closely adjacent the mouth of the burner. Occasionally a primary rod will jump from one groove to another when a stone passes through the simplified guide, and this requires realigning of the rod. It is difficult to gain access to such a guide for the purpose of realigning the rod because of the size of the burner. Thus, a burner of smaller dimensions is desired.

It is an object of the present invention to produce a high velocity, high temperature, highly turbulent, gaseous blast in a form suitable for heating a plurality of solid rods or molten streams of glass to attenuating temperature and then attenuating them into very fine fibers.

It is a further object of the invention to provide an improved process for making glass fibers by means of an efficient, economical, high temperature, high velocity, highly turbulent, gaseous blast. It is a further object of the invention to provide a burner of minimum size for producing a blast of maximum dimensions.

It is another object of the invention to provide a burner for producing a high temperature, high velocity, highly turbulent, gaseous blast by burning a combustible mixture of gases supplied to the burner at a high average flow velocity, i.e. 40 to 200 or more feet per second. It is desired that the burner be capable of producing such a blast which, if it contains any unburned gases, such unburned gases are on the outside and not on the inside of the blast upon contact with the glass finaments. It is desired that such a burner be capable of producing the blast for longer periods of time without maintenance downtime than presently used burners.

It is an additional object of the invention to provide means for stabilizing the combustion of gases moving at a high average flow velocity so as to produce a high temperature, high velocity, highly turbulent, gaseous blast of substantially completely burned gases which are ideally suited for direction against glass filaments to soften and attenuate them into very fine fibers.

These and other objects of the invention are accomplished by supplying a stream of a combustible mixture of gases to a burner at a high average flow velocity, burning the gases within an enclosed space in the burner, said space having a cross-sectional area perpendicular to the line of flow which is approximately the same as the cross-sectional area of the blast to be produced for attenuation of the primary rods and stabilizng the burning within this space by means of a bluff body such as a rod. The rod is positioned so that the stream has to separate and pass around the rod, thereby producing eddy currents in the central or interior portion of the stream just downstream of the bluff body and reducing the average forward flow velocity of the gases in this area just downstream of the bluff body. The central or interior portion of the stream downstream of the bluff body serves as an anchoring area in which combustion of the gases is initiated. The burning of the gases is continued from the interior of the stream to the exterior of the stream as the gases pass through the enclosed space to complete substantially the burning of the gases. The burned gases are issued in the form of a high temperature, high velocity, highly turbulent gaseous blast without reducing the cross-sectional area of the blast. The blast is directed against the filaments or streams of glass to heat and attenuate them. The means and manner of accomplishing these objects are further described in conjunction with the drawings in which:

FIG. 1 is a diagrammatic elevation of a fiber forming process;

FIG. 2 is a section taken along line II—II of FIG. 1 illustrating a burner for use in the practice of the invention;

FIG. 3 is a section taken along line III—III of FIG. 2;

FIGS. 4 to 7 are isometric views of different types of rods which are suitable for use in the burner shown in FIGS. 1 to 3;

FIG. 8 is a section illustrating another embodiment of the burner shown in FIG. 2;

FIG. 9 is an elevation of a burner and associated elements of an alternative structure embodying the invention;

FIG. 10 is a plan of the structure shown in FIG. 9;

FIG. 11 is an end elevation of the structure shown in FIG. 9 and is taken along line XI—XI of FIG. 9;

FIG. 12 is a section taken along line XII—XII of FIG. 10;

FIG. 13 is an enlarged partial elevation, partly in section, of the embodiment shown in FIG. 9; and FIG. 14 illustrates the use of the invention for the attenuation of molten streams of glass.

In FIG. 1 a portion of a forehearth 10 of a continuous glass melting furnace is shown. The forehearth is formed of refractory blocks, and it has a platinum alloy, trough-like bushing 14 mounted at the bottom of a well in the forehearth. The alloy may consist of 90 percent by weight platinum and 10 percent by weight rhodium. Molten glass 15 flows from the melting furnace into the forehearth and through orifices 18 of bushing 14. The orifices are located in the form of rows in the bottom portion of the bushing. The orifices are defined by hollow, cylindrical tips 20 which are formed on openings in the bottom portion of the bushing. The tips extend a slight distance below the level of the bottom portion of the bushing.

Terminals 22 are welded to the end walls at opposite ends of the bushing. These terminals are connected to a source of current (not shown) and the glass in the bushing and passing through the orifices is heated by conduction of heat from the electrically heated bushing, including the tips. The details of the bushing and its operation are more fully described in U.S. Patent No. 2,965,696.

The temperature and viscosity of the glass as it flows through the bushing is controlled by the amount of electric current which passes through the bushing. The glass forms a cone 28 at the bottom of each tip 20 with the apex of the cone facing downward. The glass which forms the primary filament 30 is drawn off the apex of the cone by suitable means such as rollers 32 which grip the filament after it has solidified. The degree of necking down or attenuation of the glass in the cone is controlled by the speed at which the solid filament is pulled away from the cone and the temperature of the glass in the cone and in the filament slightly below the cone as controlled by the temperature of the bushing.

The solid primary filaments 30 are aligned in a metal guide 34 in side by side relation in a straight row prior to their passage between the rollers 32. The guide 34 may be in the form of a comb. The filaments pass from the comb guide 34 into a slotted metal guide 35 and then between the pulling rollers 32. The filaments then pass from the rollers into grooves in another metal guide 36. The guide 36 introduces the filament into a gaseous blast 37 formed by a burner 38. The heat in the blast softens the glass filaments and the velocity and turbulence of the blast draws them out into very fine, discontinuous fibers 40. The fibers are gathered in the form of a fluffy blanket on a foraminous conveyor 41 according to conventional practices.

The guide 36 may be heated so as to pre-heat the solid filaments prior to their entry into the blast or the filaments may be otherwise pre-heated by suitable means prior to their entry to the blast to aid in re-heating the filaments to attenuating temperature. A thermosetting resinous binder 42 is usually applied by spray means 44 to the fibers as they pass through the air and prior to their being collected on the conveyor. The blanket may then be compacted and heated to cure the binder, and bind the fibers to each other.

The burner 38 produces an improved high temperature, high velocity, highly turbulent blast for attenuation of the primary filaments. This burner is shown in greater detail in FIGS. 2 and 3. The burner 38 has a long, narrow chamber 45 partly formed by silicon carbide or other suitable refractory material 48. The refractory material 48 is enclosed at the top and bottom by refractory insulating blocks 49 and this assembly is held in place by a metal cover 52. The blocks 49 may be made of aluminum silicate or other suitable insulating brick and the metal cover may be steel. The metal cover is attached to an end or extension plate 56 by means of bolts 58 extending from the cover 52 and passing through holes in the plates 56 and bolted thereto by nuts 60.

A combustible mixture of gases such as natural gas and air is supplied to the burner 38 through supply line 62. A mixture of propane and air or atomized liquid fuels and air can also be used. The terminus of line 62 is connected to a transition conduit 63 which may be in the shape of a Mache-Hebra nozzle so as to reduce the flow path dimensions to the same as those of the chamber 45. Screens 64, having a mesh which can vary between 16 to 100, preferably 40 to 60, are positioned across the flow path at the inlet and outlet connections of conduit 63 to break up any large eddies and to tend to equalize any velocity differences in the gases as may be caused by the curved configuration of supply line 62. It is desired that the velocity profile of the gases in the initial section 65 of the burner chamber 45 prior to the rod 66 be substantially rectangular and that the turbulence of the gases be uniform. The transition conduit 63 and the screen 64 may take other forms, so long as they function to make the velocity and turbulence of the gases passing into section 65 substantially uniform just prior to the rod. For example, any type of foraminous member that will produce this effect can be used. The Reynolds number of the gases at a point several inches prior to their contact with the rod is approximately 12,000 to 16,000.

Mounted in the chamber 45 in its initial section 65 several inches from the beginning of the chamber is a bluff body such as rod 66 which extends from one side wall to the other completely across the chamber. The rod may be made of stainless steel or other material that will withstand the conditions of operation. This rod may be circular in cross-section as shown in FIG. 4 or it may have other configurations such as shown in FIGS. 5 to 7 inclusive. In FIG. 5 the cross-section of the rod 67 is in the form of a V with the apex of the V pointing toward the unburned gases. It has been found that rod 67 performs its function better when the apex of the V is directed at an angle, i.e., 1 to 45°, to the general direction of flow of the gases through chamber 45. Small openings may be present in the rod 67 to permit a small portion of the combustible mixture of gases to flow through the rod as well as around it. The rod 70 shown in FIG. 6 has a cross-section in the form of an I beam with the web being generally transverse to the flow of the gases. The rod 70 may also have small openings in the web of the I beam. In FIG. 7 a rod 74 is shown having a cross-section in the form of a block letter C with the upright portion of the C being generally transverse to the flow of the gases. Small openings may be present in any portion of the latter. Rods 70 and 74 likewise perform their functions better when the web or upright portion are at an angle, i.e., 45 to 89°, to the general flow of the gases through the chamber. Other forms of rods may be used and more than one rod may be employed. For instance, the rods may be employed as a series of spaced vertical rods across the width of the chamber 45 rather than as a single continuous horizontal rod. The function of the rods is described below in connection with the operation of the process.

In the operation of the apparatus described in FIGS. 1 to 7, a combustible mixture of gases is supplied to chamber 45 at a pressure of ½ pound per square inch or more and a flow rate at the position in the chamber just prior to the rod of about 40 to 200 feet per second. The cross-sectional dimensions of the chamber 45 in its initial section 65 as well as that portion enclosed by refractory material 48 may be for example ¾ by 6½ or ¾ by 15 inches. These dimensions are designed to correspond to and produce a blast of approximately the same dimensions at a distance of about 1 to 2 inches from the mouth of the burner. The width of the burner and the blast may vary to accommodate the number of primary filaments and the rate at which they are to be fiberized. The length of the chamber 45 from the inlet to the rod is 4 or more inches and from the rod to the outlet is 8 or more inches.

The overall dimensions of the rod such as rod 66 may be 0.030 to 0.50 inch in diameter for a chamber ¾ inch in height. The rod extends horizontally completely across the chamber 45. The rod is designed to occupy about 4 to 67 percent of the cross-sectional area chamber 45 and produce additional turbulence in the rapidly flowing gases.

To start the burning, the unburned gases are supplied in the initial section 65 of the chamber prior to the rod 66 at a relatively low pressure of, for example less than 2 ounces per square inch, and a velocity of about 10 to 70 feet per second, preferably about 30 feet per second. A stoichiometric gaseous mixture of about 10 parts of air to 1 part of natural gas can be used. A spark igniter 76, such as a Testlacoil, is inserted or mounted in the chamber 45 through an opening 77 and a spark is created on the downstream side of the rod. The spark jumps from the igniter to the rod and in so doing the gases are ignited and the flame becomes anchored to the rod. Immediately after ignition the pressure of the unburned gases increases to a pressure of 2 to 10 ounces per square inch, preferably 5 ounces per square inch. Other methods of igniting the gases may be employed.

The flame progresses sideways along the length of the rod and a stabilized flame is produced within the chamber 45 extending from the rod all the way across the width of the chamber. If a series of vertical rods are employed, the gases must be ignited at each rod. The flow rate of the unburned gases when the burner of FIG. 3 is used is then gradually increased to prevent thermal shock of the refractory 48. The flow rate is increased over a period of 3 to 15 minutes until the flow rate just prior to the rod is approximately 40 to 200 feet per second depending upon the size and amount of secondary fibers which are to be produced. By this time the burning is taking place throughout a substantial length of the burner. The higher the flow rate, the finer the fiber diameter and/or the greater the amount of fiber which is produced. After the flow rate has been increased to the desired rate, the pressure of the unburned gases is about 5 to 40 ounces per square inch depending upon the desired velocity, chamber dimensions and dimensions of the bluff body. Higher pressures are used when higher velocities are desired, when the bluff body takes up larger portions of the chamber area and when the length of the chamber is greater.

The rod, being non-streamlined in shape, serves to create a considerable amount of turbulence in the gases as they pass it and to produce eddy currents directly behind it to thereby anchor or stabilize the burning of the rapidly moving gases in the wake of the rod. The burning begins just downstream of the rod, less than ⅛ inch, and continues along the length of the chamber for about 6 to 10 inches or more. At high flow rates, i.e. above approximately 100 feet per second, the flame necks down for several inches from the rod and then gradually increases in height so that it contacts the chamber wall near the outlet. This necking down is more apparent as flow rate is increased. The burning of the gases may or may not be substantially complete within the chamber.

The height of the blast which engages the primary filaments should be about ½ inch or more to permit the primary filaments to be in the blast for a length of time sufficient to soften them at high delivery speeds. The enclosing of the blast serves to shield the blast from the atmosphere until the gases are completely burned and the blast becomes of sufficient dimensions for optimum fiberization of the primary filaments. The shielding of the blast prevents loss of heat from the blast to the surrounding atmosphere by mixing therewith. It also prevents loss of kinetic energy which would be used to raise the velocity of the surrounding atmosphere to approach that of the blast. The refractory material 48 is not necessary to support combustion of the gases. The blast which issues from the opening 78 of the burner has a temperature of about 3000° F. or more and a velocity of about 500 to 1000 or more feet per second. The turbulence created in the blast during its burning within chamber 45 is maintained to a substantial extent and the intensity of turbulence in the blast issuing from the burner is of the order of 10 to 50 percent.

The blast thus produced impinges on the primary filaments 30 and softens and attenuates them. As shown in the drawing, the angle of meeting of the blast 37 with the primary rod 30 is about 70°, however, this angle of meeting may be different, for example, from 45 to 120°.

The specific pulling rate of the blast 37 as thus produced is greater than the pulling rate of any blast heretofore commercially used. The specific pulling rate is the feet of fiber produced per individual primary filament per second. The blast has been observed to be more efficient in that it burns off a greater amount of primary filament per unit of gas employed than previous gaseous blasts. The attenuating ability of the blast has been observed to be superior in comparative tests in that it produces the same pounds per hour of a finer secondary fiber, and it produces more pounds per hour of the same size secondary fiber as commercially used blasts. The diameter of the fibers may range from less than about 1 up to 25 or more microns. The improved attenuating ability is believed to be due in part at least to the increased amount of turbulence in the blast as compared to a blast formed in a combustion chamber burner with a restricted outlet orifice. The average fiber length is greater than that produced by the prior processes wherein a gaseous blast is employed. The blankets produced by the new process have greater resiliency and greater tensile strength in both longitudinal and transverse directions in the blanket.

Another embodiment of the invention is shown in FIG. 8. The burner 80 is constructed in the same manner as the burner shown in FIGS. 2 and 3 with the exception that the cross-sectional area of the refractory portion of the chamber 81 just beyond the rod is slightly larger than that of the initial section 65 as formed by offsets 82 in the chamber. In this embodiment, the offsets 82 create an area of turbulence and low velocity. This helps to stabilize the burning and the offsets serve as anchors for the flame. The offsets are positioned just slightly downstream of the rod 66, for example, about ½ to 1 inch from the rod. In starting the burning, the ends 83 of the initial section 65 are contacted with a spark in the same manner as the rod 66 as described above and the flame extends both from the rod and from the offsets formed by the end of initial section 65 and refractory blocks 84. The advantage of this embodiment is that greater heat release per length of chamber can take place. This permits a shorter chamber to be used. The shorter chamber provides the operator with easier access to the guide 36 for threading the primary filaments 30 into the guide.

A further embodiment of the invention is shown in FIGS. 9 to 13. In the apparatus shown in these figures the gases are supplied to a burner 87 by means of a pipe 88 which is connected in a right angle connection to the central portion of a cylindrical supply chamber 89 having a discharge outlet 90 in the form of a slot along one side of the chamber parallel to the axis of the chamber and 90° removed from the intersection of the axis of pipe 88 with chamber 89. The gases flow vertically in pipe 88 from a suitable compressor (not shown) and spread out laterally in a horizontal direction throughout the length of chamber 89. The pipe may have, for example, an inside diameter of 4 inches. The chamber corresponds in length to the width of the blast to be produced and may be, for example, 15 inches in inside diameter. The slot 90 has the same dimensions as the inside of the burner 87.

A plate 91 is attached to the supply chamber 89 and has an opening 92 in it which corresponds to the opening in the cylindrical housing 89. Another plate 93, similar to plate 91, is bolted to plate 91 so as to hold a plurality of perforated plates 94 between the two plates. These plates have holes 3/16 inch in diameter on 5/32 centers and are separated about 1/8 inch from each other by a separator plate 95 having an opening therein coinciding with opening 92. The plates are mounted so that the holes in succeeding plates are offset about 5/64 of an inch to create a tortuous path for the gases passing through the holes in the plates. Screens having a mesh of about 16 to 100 can also be used instead of the perforated plates. The perforated plates or screens tend to eliminate large eddies and equal any velocity differences in the gases as may be caused by the curved flow of the gases through pipe 88 into chamber 89 in which the gases spread laterally and are also reduced in flow thickness to the dimension of the outlet slot 90 in the chamber 89. The plates 94 serve the same function as the screens 64.

The openings in the plates or screens can be provided in other ways. For example, the openings can be provided by a plurality of cylindrical tubes mounted with their axes parallel to the direction of flow of the gases. A plurality of layers of corrugated sheet metal superposed on each other can also be used. The openings thus provided may be longer and thus can be larger in cross-sectional area to achieve the same effect as the screens. Due to the larger size of these openings, they are less likely to become clogged with dirt than the screens.

The finer the size of the openings in the plates or screens, the better the plates or screens serve their purpose of providing uniformity to the flow characteristics of the gases passing through them and into the main chamber 96 of the burner 87. The only consideration with respect to the fineness is that if the openings are too fine, the plates or screens must be changed fairly frequently because dirt in the gases tends to clog up the openings in the screen and reduce the amount of gases that can be supplied to the burner as well as distort the flow pattern by plugging up more in one area than another. When screens are employed, a screen of 40 mesh has been found to be most suitable.

The main chamber 96 of the burner may be formed throughout its length of metal, such as stainless steel, having a wall thickness of about 1/8 to 1/4 inch. A rod 66 is mounted in the chamber 96 in the same manner as in chamber 45 of burner 38 shown in FIG. 3, and the gases are ignited in the same manner as described above with respect to the operation of burner 38.

Burner 87 is different from burner 38 in that it has water cooled jackets 100 mounted on the top and bottom surfaces of the chamber beginning about an inch or so from the beginning of the chamber where it connects to the screens and extending to the discharge end of the chamber. Triangular braces 101 are welded to the outside of the jackets across the width of the jackets at about 2 inch intervals to provide structural strength to the burner. The braces 101 may be ¼ inch thick and be 1½ inch high at the center, sloping evenly to both sides of the burner.

The jackets 100 are provided with a cooling fluid such as water at room temperature supplied through inlets 102 in the walls of the jackets and withdrawn through outlets 104 in the walls of the jackets. The jackets are subdivided into a plurality of passages by dividing walls 105 which extend laterally across the chamber a distance which is an inch or so short of the width of the chamber so that the cooling water passes through a circuitous path from the front end to the rear end of the chamber. This aids in the uniform cooling of the walls of the chamber 96 by insuring that the water or other cooling fluid comes into contact with complete top and bottom surfaces of the chamber walls. The inlets 102 are near the discharge end of the chamber 96, and the outlets 104 are near the inlet end of the chamber 96 so that the flow of cooling fluid is countercurrent to the flow of the burning gases. The burner is tilted forward at an angle of about 5 to 12° from the horizontal so that the cooling fluid must flow uphill in the chambers. This also insures that the cooling fluid is in contact with the surface area of the walls of the chamber and permits the cooling jacket to be substantially completely filled with the cooling fluid throughout the operation.

The flow of cooling fluid is at a rate which is sufficient to keep the metal walls of the chamber 96 below the ignition temperature of the combustible materials. It is preferred when room temperature water is used as the cooling fluid that the flow rate be sufficient that the water temperature is raised not more than about 30 to 40° F. The cooling of the chamber 96 in this manner improves the stability and uniformity of burning within the chamber by eliminating extra random intermittent ignition points which cause uneven ignition and erratic burning. It also lengthens the operating life of the burner.

As shown in FIG. 9, the burner 87 may be provided with a pressure tap 106 connected to a pressure gage 108. The tap 106 is provided in chamber 96 between the rod 66 and the connection of the chamber with plates 94. The pressure gage 108 provides a direct indication to the operator of the velocity of the gases contacting the primary filaments 30. Present systems do not lend themselves to this type of accurate measurement. This arrangement of pressure tap and gauge may be employed in burner 38 by connecting the tap to the initial portion 65 of the chamber 45. Obtaining an accurate measurement relative to the velocity of the gases striking the primary filaments is advantageous when a series of burners are employed in a row to attenuate a plurality of filaments which are collected in a blanket. In order to produce a uniform product, i.e. uniform density throughout the mat, it is desirable that the primary filaments be of the same size and fed at the same rate and that the blasts all have the same temperature and velocity. The tap 106 and gage 108 permit the operator to observe directly the operating conditions of a number of burners and to make the proper adjustments to keep them all operating so as to produce a plurality of uniform blasts.

The cooling of the chamber 96 permits the flow rate to be increased immediately instead of gradually in starting up the burner. For example, a combustible mixture of natural gas and air is supplied to the initial portion of the chamber at a relatively low pressure of 2 to 10 ounces per square inch, preferably 5 ounces per square inch as measured at point 108 which is near the inlet end of chamber 96 and is upstream of the rod. The flow velocity of the gases is about 10 to 70 feet per second in starting up, preferably about 30 feet per second. A stoichiometric gaseous mixture of about 10 parts of air to 1 part of natural gas can be used.

The gases can be ignited by means of a spark igniter 76 such as shown in burner 38 or can be ignited by a spark inserted through the mouth of the burner. The spark is created on the downstream side of the rod and jumps from the igniter to the rod, and in doing so, the gases are ignited and the flame becomes anchored to the rod. The flame progresses sideways along the length of the rod and the stabilized flame is rapidly established within the chamber extending from the rod all the way across the width of the chamber.

The flow rate of the unburned gases can be rapidly increased over a period of 5 to 20 seconds until the flow rate just prior to the rod at 106 is approximately 40 to 200 feet per second depending upon the size and amount of secondary fibers which are to be produced. The higher the flow rate, the finer the fiber diameter and/or the greater the amount of fiber which is produced. The pressure of the unburned gases is at about 5 to 40 ounces per square inch as measured at 108 during operation of the burner. When the final flow rate of gases is attained, the burning is taking place throughout a substantial length of the chamber 96 as illustrated diagrammatically in FIG. 13.

As illustrated in FIG. 13, the rod 66, being non-streamlined in shape, serves to create a considerable amount of turbulence in the gases in the region "A" starting just beyond the rod and extending several inches therebeyond. As the gases pass over the rod, they tend to form eddy currents directly downstream of it and thereby anchor or stabilize the burning of the rapidly moving gases in the wake of the rod. The burning begins just downstream of the rod, less than about ⅛ inch, and continues along the length of the chamber for about 6 to 10 inches or more depending upon the flow rate. At high flow rates of unburned gases, for example about 100 feet per second and above, the flame or burned portion "B" necks down in cross-section for several inches from the rod and then gradually increases in thickness. As shown in FIG. 13, there is an area "C" in which burning is taking place and this area is the turbulent, undulating flame front. In the central portion of the stream of gases the burning is complete as designated in the region "B." The unburned portions of the gases in the chamber are adjacent the walls of the chamber and are designated by the letter "U."

The burning may or may not be complete within the chamber. If it is complete, it is preferably completed just as the gases leave the outlet end of the burner. A large portion of the burning takes place near the outlet or in some cases, just beyond the outlet of the chamber. The following table illustrates the pressures which can exist in the chamber of burner 87 during the operation of the burner, with the pressures being measured at different distances downstream of the rod in a chamber which extends 10½ inches from the rod:

| Distance from the rod (inches) | Static pressure (ounces per square inch) |
|---|---|
| −0.75 (upstream of rod) | 16 |
| +0.75 | 10 |
| 2.5 | 9.5 |
| 4.5 | 8 |
| 6.5 | 5.5 |
| 7.5 | 3.5 |
| 8.5 | 1.5 |
| 10.5 | 0 |

The height of the blast which engages the primary filaments should be about ½ inch or more to permit the primary filaments to be in the blast for a length of time sufficient to soften them at high delivery speeds. In this regard the present invention provides a further advantage over the use of the burner disclosed in U.S. Patent 2,489,242 in that it permits the primary rods to be directed at an angle substantially less than 90° to the direction of the blast. As the primary filaments are angled into the blast, for example at an angle of 45 to 70°, the primary filaments spend more time in the blast than when they are directed into the blast at a 90° angle. This permits a longer period of travel for heating of the primary filaments and thus permits them to be fed and softened at a higher rate due to the longer distance of travel through which they are exposed to the blast.

It is desired to inject the primary filaments 30 into the attenuating blast as close to the discharge outlet of the burner as possible. The temperature and velocity of the blast drop off appreciably as the distance from the outlet of the burner increases. The large size of the combustion chamber and the insulation required in the burner of the prior art prevents the primary filaments from being inserted at an angle much less than 77° to the direction of the blast for at lower angles the primary filaments do not enter the blast close enough to the outlet of the burner to take full advantage of the temperature and velocity of the blast to attain maximum attenuation. Thus, less heating of the primary filaments in the prior art process is attained.

As shown in FIGS. 9 and 13 the primary filaments 30 are guided into the blast by means of a plurality of rollers and grooved rods, rather than the setup shown in FIG. 2. In FIG. 9 the primary filaments first pass over grooved rods 110 and 112 and then between coacting pulling rollers 114 similar to rollers 32. The coacting pulling rollers 114 pull the primary filaments and direct them through grooves in grooved rod 116 and another grooved surface in grooved rod 118 which guide the primary filaments into the blast at an angle of about 70°. The height of the blast which engages the primary filaments is about ½ inch to ¾ inch. This permits the primary filaments which are directed at an angle into the blast to be in the blast for a length of time sufficient to soften them at high delivery speeds.

The following conditions are exemplary of the operation of the burner with respect to the production of a discontinuous fiber having an average diameter of 0.00015 inch. A burner having an outlet dimension and chamber dimension of 15 inches by ⅝ inch is employed. Two hundred thirty (230) primary filaments 30 are arranged in a row and fed into the blast in side by side relation at an angle of about 70° to the direction of the blast. The primary filaments contact the blast at a distance of about ⅛ inch from the outlet of chamber 95. These primary filaments have an average diameter of 0.016 to 0.02 inch and are fed at a rate so as to obtain the burning off in production of 0.37 pound per hour of final fiber per primary filament.

In order to produce a blast to operate under conditions suitable for such manufacture, a stoichiometric mixture of natural gas and air at about room temperature is supplied to the burner at approximately 2300 standard cubic feet per hour and a pressure as measured at 108 of 18 ounces per square inch. The gaseous mixture at 108 has a Reynolds number of about 30,000. The resultant velocity and temperature of the blast are about 600 feet per second and 3000° F. The intensity of turbulence in the blast is of the order of 30 percent.

The use of a plurality of burners such as shown in FIGS. 9 to 13 in side by side relation in a forming chamber in the manner shown in U.S. Patent No. 2,965,696 permits the maximum utilization of the area of the forming chamber. Only about 1 inch exists between the blasts issuing from the burners as contrasted to a much greater unproductive area of about 6 inches when burners of the prior art have been used in side by side relation.

The present invention and its application to the attenuation of molten streams of glass is shown in FIG. 14. The ability to place the burners in side by side relation with very little space between the blast issuing from the burners is helpful in this type of process in the same manner as described above with respect to a process where the burners are aligned in a substantial horizontal plane. In this figure an annular burner 120 constructed in the same manner as burners 38, 84 or 90 but in an annular shape is shown surrounding a centrifuge 122. The centrifuge has a series of orifices 124 arranged in rows around its periphery and it is rotated by suitable means such as a pulley 126 connected to a motor (not shown). The centrifuge is mounted in bearings 128 and is supplied with molten glass 130 through its hollow shaft 132.

The molten glass may be supplied from a forehearth of a glass melting tank (not shown). The glass strikes the bottom of the centrifuge 122 and is caused to move outwardly along the bottom to and through the orifices 124 in the form of streams 131 by means of the centrifugal force created by the rotation of the centrifuge. The blast 134 produced by the burner 120 strikes the streams 131 of molten glass issuing from the orifices and immediately heats them, bends them downwardly and attenuates them into fine fibers. The fibers are collected on a conventional foraminous conveyor. Further details of this type of process, known as a centrifugal spinning process are described and shown in U.S. Patent No. 2,624,912.

Although the present invention has been described with respect to specific details of certain embodiments thereof, it is not intended that such details be limitations upon the scope of the invention except insofar as set forth in the accompanying claims. For example, the invention is applicable to the formation of fibers from heat softenable materials other than glass.

I claim:
1. A method of producing a high temperature, high velocity, highly turbulent, gaseous blast which comprises:
   (A) flowing a combustible mixture of gases into an elongated chamber at a high rate of flow and at substantially uniform velocity and turbulence,
   (B) interrupting the flow of the gases by a bluff body mounted in the chamber so as to create additional turbulence in the gases passing downstream of the bluff body and produce eddy currents of unburned gases immediately downstream of and behind the bluff body,
   (C) burning the eddy of unburned gases adjacent the downstream side of the bluff body to anchor a stable, self-sustaining flame to said bluff body and propagating the flame to the combustible mixture flowing past the burning eddy,
   (D) directly cooling the walls of the chamber downstream of the bluff body to maintain them at a temperature below the ignition temperature of the combustible mixture of gases, and
   (E) issuing the burned gases into an atmosphere of air without reducing the cross-sectional area of the gases.

2. Apparatus for producing a high temperature, high velocity, highly turbulent, gaseous blast which comprises:
   (A) an elongated rectangular chamber of uniform cross-section in which a combustible mixture of materials is burned,
   (B) supply means for introducing combustible materials into the chamber at a high rate of flow, and at substantially uniform velocity and turbulence,
   (C) a rod mounted within the chamber across the flow path of the unburned materials and
   (D) means for directly cooling the walls of the chamber downstream of the rod to a temperature below the ignition temperature of the combustible mixture of materials.

3. The apparatus of claim 2 further including foraminous means mounted in the supply means across the flow path of the combustible materials to effectively eliminate large eddies and equalize the velocity and turbulence of the materials passing downstream thereof.

4. The apparatus of claim 3 further comprising:
   (A) a pressure tap into the chamber at a position between the foraminous means and the rod, and
   (B) a pressure indicator attached to the pressure tap outside the chamber.

5. The apparatus of claim 2 wherein the rod is V shaped and the apex of said V shaped rod is directed at an angle of from 1° to 45° to the general direction of the flow of materials through the chamber.

6. A method of forming glass fibers which comprises:
   (A) providing glass in a form in which it can be attenuated,
   (B) flowing a combustible mixture of gases into an elongated chamber disposed adjacent said glass to be attenuated at a high rate of flow and at substantially uniform velocity and turbulence,
   (C) interrupting the flow of the bases by a bluff body mounted in the chamber so as to create additional turbulence in the gases passing downstream of the bluff body and produce eddy currents of unburned gases immediately downstream of and behind the bluff body,
   (D) burning the eddy of unburned gases adjacent the downstream side of the bluff body to anchor a stable, self-sustaining flame to said bluff body and propagating the flame to the combustible mixture flowing past the burning eddy,
   (E) directly cooling the walls of the chamber downstream of the bluff body to maintain them at a temperature below the ignition temperature of the combustible mixture of gases,
   (F) issuing the burned gases into an atmosphere of air without reducing the cross-sectional area of the gases to provide a high temperature, high velocity, turbulent attenuating gaseous blast, and
   (G) subjecting said glass to be attenuated to said attenuating gaseous blast.

References Cited by the Examiner

UNITED STATES PATENTS

| | | | |
|---|---|---|---|
| 2,489,242 | 11/49 | Slayter et al. | 18—2.5 |
| 2,489,244 | 11/49 | Stalego | 18—2.5 |
| 2,592,110 | 4/52 | Berggren et al. | 158—4 |
| 2,645,814 | 7/53 | Stalego | 18—2.5 |
| 2,878,644 | 3/59 | Fenn | 158—4 |
| 2,908,733 | 10/59 | Sage | 158—4 |
| 3,015,127 | 1/62 | Stalego | 18—2.5 |

DONALL H. SYLVESTER, *Primary Examiner.*

MICHAEL V. BRINDISI, MORRIS O. WOLK,
*Examiners.*